(12) United States Patent
Hood

(10) Patent No.: US 9,324,092 B2
(45) Date of Patent: Apr. 26, 2016

(54) DISPLAY SYSTEM

(75) Inventor: Jeffrey Hood, Lancaster, PA (US)

(73) Assignee: K & W Tire Company, Inc., Lancaster, PA (US)

( * ) Notice: Subject to any disclaimer, the term of this patent is extended or adjusted under 35 U.S.C. 154(b) by 493 days.

(21) Appl. No.: 13/568,734

(22) Filed: Aug. 7, 2012

(65) Prior Publication Data

US 2014/0047376 A1 Feb. 13, 2014

(51) Int. Cl.
*G06F 3/048* (2013.01)
*G06Q 30/02* (2012.01)
*G06Q 30/06* (2012.01)

(52) U.S. Cl.
CPC ........ *G06Q 30/0241* (2013.01); *G06Q 30/0623* (2013.01)

(58) Field of Classification Search
CPC .................. G06F 17/30017; G06F 2211/007; G06F 17/212; G06F 17/30256
USPC .......................................... 715/781, 764, 810
See application file for complete search history.

(56) References Cited

U.S. PATENT DOCUMENTS

| | | | | |
|---|---|---|---|---|
| 5,828,666 | A | * | 10/1998 | Focsaneanu et al. ......... 370/389 |
| 5,832,083 | A | * | 11/1998 | Iwayama et al. ................ 705/51 |
| 5,844,552 | A | * | 12/1998 | Gaughan et al. ................ 725/37 |
| 6,092,080 | A | * | 7/2000 | Gustman .............................. 1/1 |
| 6,147,890 | A | * | 11/2000 | Kawana et al. ............. 365/49.1 |
| 8,832,577 | B2 | * | 9/2014 | Sirpal et al. .................... 715/770 |
| 8,843,853 | B1 | * | 9/2014 | Smoak et al. ................. 715/839 |
| 8,875,047 | B2 | * | 10/2014 | Beykpour et al. ............. 715/788 |
| 8,890,808 | B2 | * | 11/2014 | Nan et al. ....................... 345/157 |
| 8,892,999 | B2 | * | 11/2014 | Nims et al. .................... 715/706 |
| 2001/0042014 | A1 | | 11/2001 | Lowry et al. |
| 2005/0010475 | A1 | | 1/2005 | Perkowski et al. |
| 2008/0243593 | A1 | | 10/2008 | Ko et al. |
| 2009/0144156 | A1 | | 6/2009 | Girgis et al. |
| 2010/0223122 | A1 | | 9/2010 | Prince, III et al. |
| 2011/0145073 | A1 | | 6/2011 | Richman et al. |
| 2011/0246291 | A1 | | 10/2011 | Paul |
| 2011/0258023 | A1 | | 10/2011 | DeGironemo |

FOREIGN PATENT DOCUMENTS

| | | |
|---|---|---|
| FR | 2887361 A1 | 12/2007 |
| JP | 2007129538 A | 5/2007 |

OTHER PUBLICATIONS

Mike Graber, Industry Technology Strategist, Microsoft Retail and Hospitality, Building Rich Interactive Kiosks, published 2012 Microsoft, 15 pages.

\* cited by examiner

*Primary Examiner* — David Phantana Angkool
(74) *Attorney, Agent, or Firm* — Barley Snyder

(57) ABSTRACT

A content control system is provided for displaying mixed media content. The content control system includes a display module, a content module and a control module. The display module includes a display device and a information appliance device connected to the display device. The information appliance devices includes a display processor to processes a signal into displayable content for the display device. The content module is connected to the information appliance device and includes a storage device storing data for the signal and a content processor that sends the signal to the information appliance device. The control module connects to the content module and includes a user interface to view and select the data to be displayed on the display device.

52 Claims, 3 Drawing Sheets

DISPLAY SYSTEM

FIELD OF THE INVENTION

The invention relates to a display system and, more particularly, to a display assembly for displaying static and dynamic media content.

BACKGROUND

Consumers constantly require information about products and services that they wish to purchase. However, paper literature and/or salesman have generally been used to accommodate the needs of the consumer. Information provided by paper literature or even unknowledgeable salesman may not satisfy the information required by the consumer. Furthermore, hand specifications and inventory data may not be readily available. Additionally, when comparing products, it is difficult customize an particular request or analysis one or more different products, unless the combination of consumer products was previously anticipated in print or the salesman is knowledgeable enough to assist.

While the world wide web offers information on-demand, and is quite convenient for the consumer to access using a portable device (i.e. mobile phone, tablet computer). The amount of information may be overreaching, or information may not necessarily be accessible, customized for the consumer, or more importantly accurate (i.e. if the information is picked up from a third party website). Rather, there is a need to provide information to the consumer on demand, that is illustrative, and can be controlled by the manufacturer or distributor.

SUMMARY

Therefore, the invention relates to a content control system for displaying user select content with programmed content.

The content control system includes a display module, a content module and a control module. The display module includes a display device and a information appliance device connected to the display device. The information appliance devices includes a display processor to processes a signal into displayable content for the display device. The content module is connected to the information appliance device and includes a storage device storing data for the signal and a content processor that sends the signal to the information appliance device. The control module connects to the content module and includes a user interface to view and select the data to be displayed on the display device.

BRIEF DESCRIPTION OF THE DRAWINGS

The invention will be explained in greater detail with reference to embodiments, referring to the appended drawings, in which.

DETAILED DESCRIPTION OF THE EMBODIMENT(S)

Figure 1:
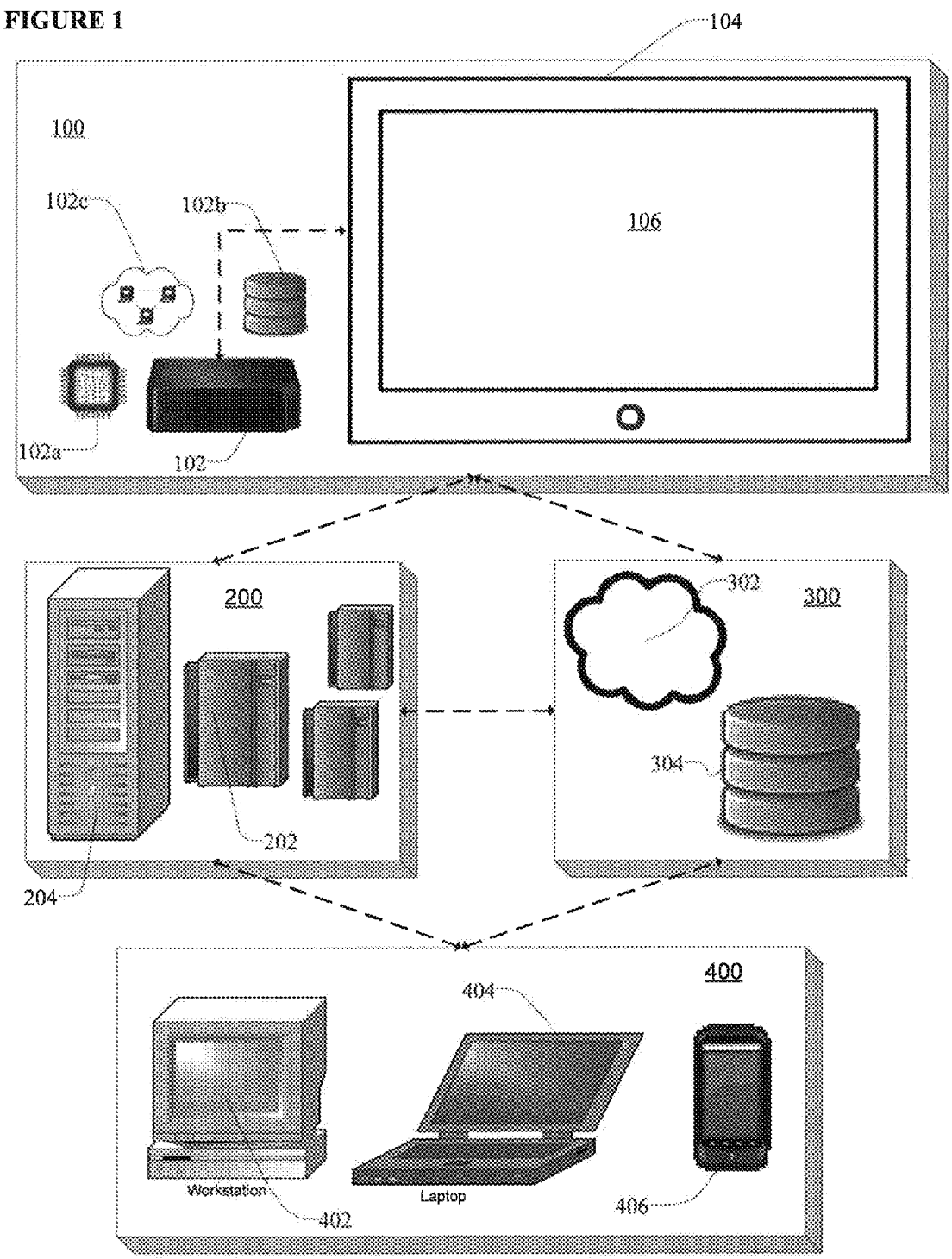
FIG. 1 is a graphical representation of a display system according to an embodiment of the invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

Hereinafter, a disclosure of a display system 1 according to the invention will be described with reference to the appended figures.

Referring first to FIG. 1, the display system 1, according to the shown embodiment includes the following major components: a display module 100, a content module 200, an external storage module 300, and a control module 400. Now each component will be further described below.

In an embodiment shown in FIG. 1, the display module 100 includes an information appliance device 102 and a display device 104. The information appliance device 102, as shown, is type of set top box that processes data to convert into displayable content, such as media content. The information appliance device 102 connects to the display device 104, both physically through cables and ports and/or wirelessly. The information appliance device 102 connects to an external source of signal from the content module 200 and includes a tuner and circuitry to convert the signal into media content, which is displayable on the display device 104. However, it is possible in other embodiments that the information appliance device 102 and the display device 104 are integrally formed into a single structural component, wherein the information appliance device 102 is integrated into the structural housing of the display device 104, and the two components are single structural component. However, for purposes of this disclosure, each component will be discussed separately in order to define the structural and functional implements of the display system 1

The information appliance device 102 includes other various modular components, including a control unit 102a and a storage unit 102b. The control unit 102a includes a communications link 102c that connects the information appliance device 102 to the content module 200 and the display module 100. The control unit 102a according to the invention is a media gateway and server unit housing tuner and a processor and circuit board for decoding the input signal from a signal source (i.e. ether net cable, satellite dish, coaxial cable, broadband, Wi-Fi, or even VHF or UHF antennas), and directing two-way communications through the communications link 102c over an IP network. The control unit 102a may include a number of communication and data ports disposed on one side of the control unit 102a and connecting to the processor housed in the control unit 102a. The number and types of ports of ports are variable, but may include Ethernet connection, IEEE 1394 interfaces, serial and parallel ports, High-Definition Multimedia Interface (HDMI), digital visual interfaces, Universal Serial Bus (USB), and coaxial connectors to name a few. Additionally, the control unit 102a includes an AC power assembly, which may include a plug and socket assembly or a direct hard wire connection to an AC plug. In an embodiment of the invention, the control unit 102a is configured to work independent from the storage unit 102b, however, the control unit 102a can connect to the storage unit 102b in order to store media and data (i.e. short term memory), which is then are quickly accessible through the storage unit 102b.

The control unit 102a is assigned a unique identifier (UID) which is guaranteed to be unique among all identifiers used for each display module 100 used of the display system 1. This UID may be a randomly assigned identifier (i.e. alphanumeric code, serial number, or random number) that is devoted and unique to the display system 1 according to the invention, or the control UID may be an existing unique identifier utilized by a component of the display module 100, such as a MAC address or IP address.

The control unit 102a includes a microprocessor that incorporates the functions of a computer's central processing unit (CPU) on a single integrated circuit or a few integrated circuits that accepts digital data as input from the content server, processes it according to instructions stored in the storage unit 102b or received from the content module 200, and provides results as output (i.e. images) to the display device 104.

The display device 104 is an electronic visual display, such as television or a monitor, and is capable of projecting visual media content to a consumer through a graphical display 106. The graphical display 106 may be a screen that utilizes electronic visual display technology, such as known liquid crystal display (LCD), cathode ray tube (CRT), light-emitting diode (LED), or digital light processing (DLP) technologies. The display device 104 also includes a power supply (not shown) and a communications link which receives media content run through the information appliance device 102.

Figure 2:
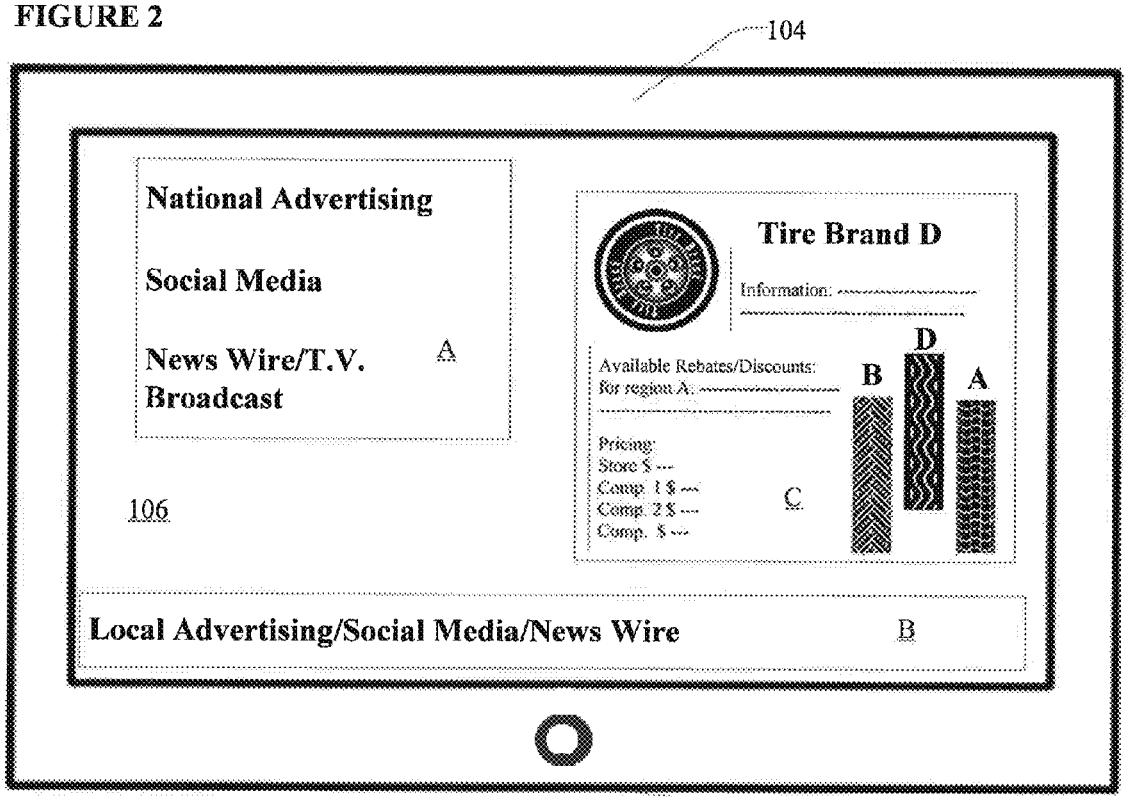
FIG. 2 is a graphical representation of a display module according to an embodiment of the invention.

As shown in FIG. 2, the display module 100 may be a single structure having the information appliance device 102 integrated with a housing of the display device 104, wherein the content module 200 connects to the control unit 102a through any number of communications links 102c provided with the display device, including Wi-Fi, infrared, Bluetooth, and any types of ports, which may include Ethernet connection, IEEE 1394 interfaces, serial and parallel ports, High-Definition Multimedia Interface (HDMI), digital visual interfaces, Universal Serial Bus (USB), and coaxial connectors to name a few.

As further shown in FIG. 2, the graphical display 106 includes a screen for displaying images. The display device 104 may include a graphical user interface (GUI) which allows a user to interact with the display device 104 to control media content displayed on the display device 104. The display device 104 may include a plurality of display sections A, B, and C. Each display section A, B, and C is a so-called window or a visual area containing some kind of user interface. Each display section A, B, and C can display different media content and images, such that different media content is displayed in each display section A, B, and C independently from each other. However, it is also possible that each of the display sections A, B, C cooperate and share common media content, such that media content in one display section A, B, and C may affect the media content displayed in another. While each display section A, B, and C, shown in FIG. 2, has a rectangular shape that overlaps the graphical display 106, other shapes and features are possible to displays output of media content. Generally, each display section A, B, and C is dedicated to a specific type of media content that may be manipulated by a user through the content module 200 and control module 400.

Figure 3:
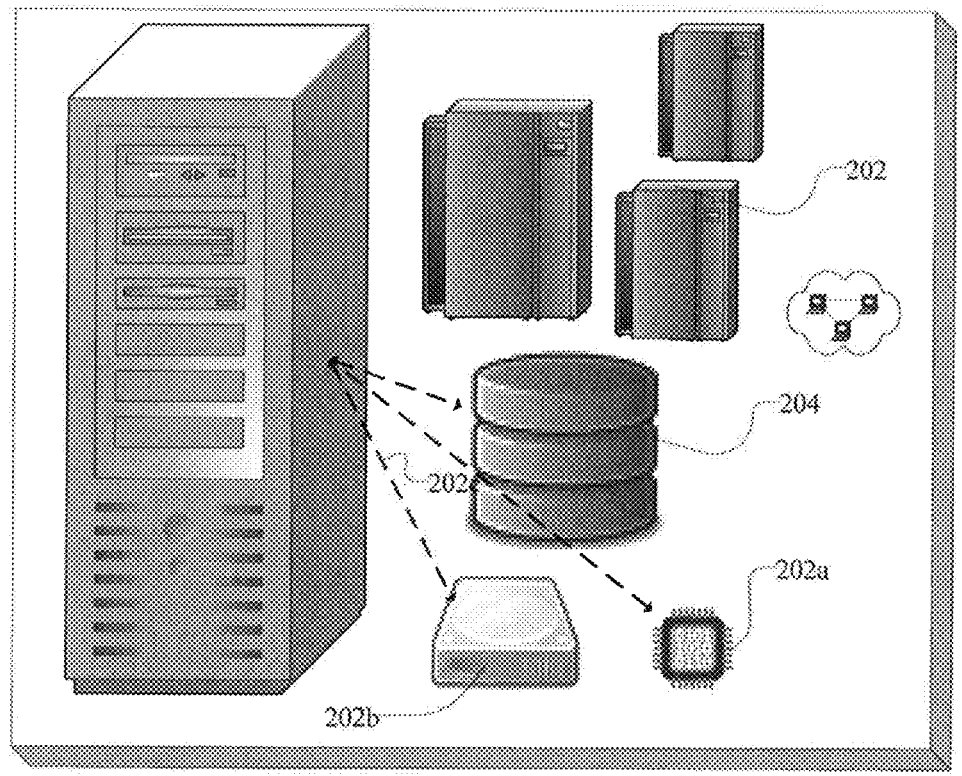
FIG. 3 is a graphical representation of a storage module according to an embodiment of the invention.

With reference to FIG. 3, an embodiment of the content module 200 is shown, and includes a physical computer dedicated to serving one or more display modules 100 and one or more control modules 400. In the embodiment shown, the content module 200 includes a communications component 202 and a primary storage component 204. The communications component 202 links the content module 200 to the display module 100, the control module 400, and the external storage module 300 (if applicable).

The content module 200 further includes a processor 200a, an internal memory 200b, and a bus component 200c. Media content can be stored in the internal memory 200b or the primary storage component 204, which is also retrievable by the processor 200a through the bus component 200c. In the embodiment shown, the processor 200a executes computer programs for the display system 1, or requests from the information appliance device 102 or control module 400. Additionally, the content module 200 can connect to the external storage module 300 or other external devices through the communications component 202. The communications component 202 may include Wi-Fi, infrared, Bluetooth, and any types of ports, which may include Ethernet connection, IEEE 1394 interfaces, serial and parallel ports, High-Definition Multimedia Interface (HDMI), digital visual interfaces, Universal Serial Bus (USB), and coaxial connectors to name a few.

The content module 200 additionally includes primary storage directly connected to the processor 200a using a bus system. The content module 200 additionally includes secondary storage, such as hard disk drives or input/output devices. The secondary storage is generally non-volatile and holds many of the executables and data used for display system according to the invention. For instance, the displayable media content may be held in the secondary storage and is accessible by the processor 200a. In the alternative, media content, executables and other information can be stored on physically external sources, such as the external storage module 300, and the retrieved by the content module 200 through the communications component 202.

With reference back to FIG. 1, the external storage module 300 is a single storage unit or storage capacity hosted externally or by third parties, but are otherwise accessible by the content module 200. The content module 200 may connect to the external storage device through a number of ways. In an embodiment, the external storage module 300 is a physically external storage unit 304, such as a storage device or computer, which is accessible by the content module 200 through a communications link, such as the internet or network system. For instance, the external storage module 300 may utilize cloud-computing resources 302 to deliver data from its own external storage capacity to the content module 200, or the content module 200 can access and pull data from the external storage capacity. The physically external storage unit 304 may be an external database, an external off-site storage hosted by a third party (i.e. a vendor, an intermediary, a wholesaler, or a manufacturer). In fact, the external storage module 300 may also be any data, public or proprietary, that is accessible by the content server through internet access.

The control module 400 is a standalone component in the display system 1, capable of operating independently from the display module 100, and in most cases independently from the content module 200 and the external storage module 300. However, the control module 400 is still connectable to the content module 200 and/or the external storage module 300. In an embodiment of the invention, the control module includes a user interface, a communications means, and a microprocessor that also incorporates the functions of a computer's central processing unit (CPU) on a single integrated circuit or a few integrated circuits. For instance, the control module 400 may be a workstation 402, a computer 404 (i.e. notebook), or mobile device 406, such a smart phone or tablet (see FIG. 4). The user interface is physical display that provides a direct manipulation interface to allow a user to manipulate objects presented to them, using actions that correspond at least loosely to the physical world. For instance, the user interface maybe a graphical user interfaces (GUI) that accepts input through connected devices such as computer keyboard and mouse and provide articulated graphical output on the computer monitor. However, the user interface may be a touch screen display accepting input by touch of fingers or a stylus. The communications means and a microprocessor would be similar to the types of communications technology and microprocessors described above with reference to the sub-components of the display module 100 and the content module 200. Therefore, for sake of brevity, description of these components has been omitted.

The control module 400 may also include peripherals, such as a camera, microphone, scanners, portable media players, and disk drives. The control module 400 can utilize or access the peripherals, such that the control module can view, retrieve, select, and push data to other components of the displays system.

A structural description of the display system 1 according to the invention is complete, and now a functional description of display system 1 will be described with reference to the above-described structural components.

The display system 1 according to the invention displays media content through the display device 104. The media content, which is either static media content or dynamic media content, is processed by the information appliance device 102 and then displayed on the graphical display 106. The information appliance device 102 stores some media content, which allows the processors to quickly process the media content for visual display on the graphical display.

The media content is a type of electronic media (i.e. digital or analog) that is displayable by an end product, such as digital video, augmented reality or digital art. In the display system 1 according to the invention, the media content is viewable on the control module 400, as well as the display module 100. However, the media content that is viewable on the control module 400 is not necessarily viewable on the display module 100.

The media content can be any audio/visual content. However, for purposes of describing one embodiment, the media content is generally directed to product and service advertisements (regional or national), social media, product and service information (i.e. store, service specials, discounts, rebates), local information (i.e. store, area, local attractions, service specials, discounts, rebates, weather, traffic), news (regional and national), and television programming.

The static media content is information that is delivered to the display module 100 exactly as stored for display though the display module 100, in contrast to the dynamic media content which is customized information/data selected by user through a requests by the control module 400. The dynamic media content is information that is pushed to the display module 100 and that has been prepared with consumer requested information (content and/or layout, i.e. type of specifications and side-by-side comparisons) for viewing by the user. It is not static media content because it changes per user selection of dynamic media content through the control module 400.

While any particular type of information/data may be either static or dynamic media content, it is classified on how it is delivered to the display module. In particular, the static media content is information to be generally displayed through the display module 100, such a news, television programming, advertisements (i.e. which may be geographically significant), offers or rebates tailored to product sold, or content which may be offered for sale by the owner of the display system 1, regardless of the user request from the control module 400. In fact, the static media content is any content that is displayed for all consumers regardless of a single user's requests or preferences. However, the dynamic media content is media content that has been tailored to the user using selections and requests performed through the control module 400. Therefore, a specific type of media content (i.e. a rebate for a tire brand) can be considered either static media content or the dynamic media content, but is static if it is displayed regardless of user control, while the same media content would be dynamic if pushed by the user through the control module 400. The dynamic media content is usually stored on the content module 200, the external storage module 300, or even the control module 400, while the static media content is generally stored on the content module 200 or the information appliance device 102. Additionally, the dynamic media content can be displayed visually using a combination of different static media content information. As a result, the dynamic media content is a user-preferred display of the static media content.

The type of media content directed to the graphical display 106 is determined by computer executables, which may be processed by different components of the display system. However, the media content is generally either scripted to display on the graphical display 106 or pushed to the display module 100 by a user request from the control module 400.

Media content can be stored on the information appliance device 102, the content module 200, the external storage module 300, or the control module 400 until it is scripted to be displayed on the display module 100 as part of a scripted display programming (static content media) or by either user request from the control module 400 (dynamic media content).

For instance, static content is programmed to display regardless of a user request from the control module. As shown in FIG. 2, section A and B of the graphical display 106 show scripted static content, such as advertising, social media, news and television programming. However, in section C the scripted static media content is replaced with dynamic media content.

Figure 4:
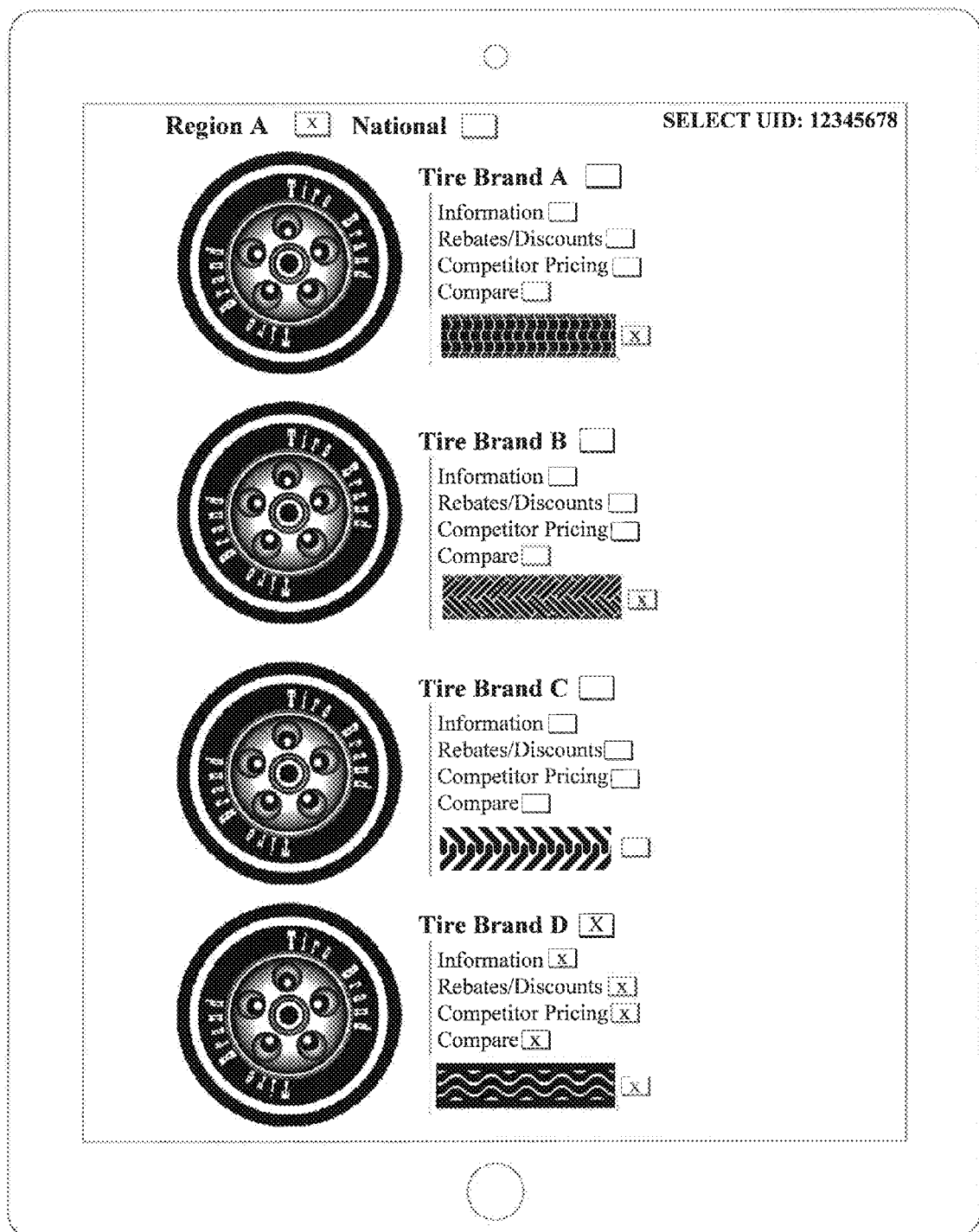
FIG. 4 is a graphical representation of a control module according to an embodiment of the invention.

For instance, with reference to FIG. 4, a control module 400 is shown displaying media content, such as product comparison, information, rebates, pricing and images, for example. The user can cycle through the different media content being displayed on the control module 400 and select various media content to be displayed on the graphical display 106. The selection of media content is not restrict to that which is shown on one window of the control module 400, but can be collected various windows and pages on the control module 400. Once the user determines what media content (i.e. collection of information found using the control module), the user can request that the content module 200 push the request to the information appliance device 102, which then displays the dynamic content on the graphical display 106. As shown in FIG. 2, display section C is replaced with dynamic media content selected by the user. The content module 200 receives the request from the control module 400 and pushes the media content from wherever it is stored. If the media content is already stored on the information appliance device 102, then the content module 200 sends a request that the media content be displayed, as dynamic media content, which replaces the static media content. FIG. 2 provides an exemplary embodiment on the type of information to be shown and where. The type of information and placement of the either static or dynamic content can vary depending on preferences in using the display system according to the invention. Furthermore, the display system 1 according to the invention can utilize other forms of data, including audio data, which can be static media content or dynamic media content, depending on if the audio data is programmed for transmission or requested by the user from the control module 400.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A content control system, comprising:
   a display module having a display device and an information appliance device connected to the display device and having a display processor to processes a signal having a static media content programmed for display on the display module and a dynamic media content selected from and pushed by the control module and includes consumer requested information requested by a user of the content module into displayable content for the display device;
   a content module connected to the information appliance device and having a storage device storing data for the signal and a content processor that sends the signal to the information appliance device; and
   a control module connected to the content module and having a user interface to view and select the data to be displayed on the display device through a physical display providing direct manipulation of the user interface by the user to select the dynamic media content presented through the user interface and pushed to the display module.

2. The content control system according to claim 1, wherein the information appliance device is a media gateway and server unit housing a tuner and includes a processor and circuit board for decoding the signal from the content module.

3. The content control system according to claim 1, wherein the information appliance device is assigned a unique identifier that is exclusive among a plurality of unique identifiers used with a plurality of information appliance devices of the content control system.

4. The content control system according to claim 3, wherein the unique identifier is a randomly assigned identifier.

5. The content control system according to claim 1, wherein the information appliance device and the display device are integrally formed into a single structural component such that the information appliance device is integrated into a structural housing of the display device.

6. The content control system according to claim 1, wherein the display device includes a plurality of display sections.

7. The content control system according to claim 6, wherein each of the plurality of display sections is a visual area containing the static media content.

8. The content control system according to claim 7, wherein the dynamic media content is displayed in one of the plurality of display sections after being selected by the user through the control module.

9. The content control system according to claim 1, wherein the content module includes a physical computer dedicated to serving a plurality of display modules and a plurality of control modules.

10. The content control system according to claim 9, wherein the content module includes a storage device.

11. The content control system according to claim 10, further comprising an external storage module storing additional data for the signal which accessible by the content module through a communications component.

12. The content control system according to claim 11, wherein the external storage module is a single storage unit hosted externally by a third party.

13. The content control system according to claim 12, wherein the external storage module utilizes cloud computing resources to deliver the additional data to the content module.

14. The content control system according to claim 13, wherein the control module connects to the external storage module such that the control module displays the dynamic media content from the additional data stored on the external storage module and pushes a request to the content module.

15. The content control system according to claim 1, wherein the control module includes peripherals to view, retrieve, select, and push data to the content module for display on the display module.

16. A method of displaying media content on content control system;
   comprising the steps of:
      providing a display module having a unique identifier unique to a plurality of unique identifiers used for a plurality of information appliance devices of the content control system and for displaying static media content programmed for display on the display module through a signal;
      providing a content module having a storage device storing data for the static media content and a content processor to process the signal from the data for the display module; and
      providing a control module having a user interface and a control processor to view and select dynamic media content stored on and pushed from the content module, the dynamic media content having consumer requested information selected by a user on the control module and for display on the display module such that the control module pushes the dynamic media content to the display module based on the unique identifier selected by the user.

17. The method according to claim 16, wherein the static media content is content for display on the display module regardless of use and selection of the dynamic media content from the control module.

18. The method according to claim 17, wherein the dynamic media content is content tailored to the user of the control module.

19. The method according to claim 18, further comprising the step of:
   providing an external storage module for storing additional data for the dynamic media content which accessible by the content module.

20. The method according to claim 19, wherein the external storage module is a single storage unit hosted externally by a third party.

21. The method according to claim 20, wherein the external storage module utilizes cloud computing resources to deliver the dynamic media content to the content module.

22. The method according to claim 19, wherein the control module connects to the external storage module such that the control module displays the dynamic media content from the additional data and pushes a display request to the display module through the content module.

23. The method according to claim 19, wherein the dynamic media content is stored on the content module, the external storage module, and the control module.

24. The method according to claim 23, wherein the static media content is stored on the content module and the display module.

25. The method according to claim 24, wherein the dynamic media content is a combination of separate static media content such that the dynamic media content is a user-preferred display of the static media content.

26. The method according to claim 25, wherein the display module includes a plurality of display sections.

27. The method according to claim 26, wherein each of the plurality of display sections is a so called window or a visual area containing some kind of user interface.

28. The method according to claim 27, wherein each of the plurality of display sections displays different content from the signal and the dynamic media content is displayed in one of the plurality of display sections.

29. The method according to claim 28, wherein one of the plurality of display sections displays the static media content scripted for programming to a plurality of display module of the content control system and another of the plurality of display sections displays the dynamic media content selected by the user on the control module.

30. The method according to claim 29, wherein the user cycles through the static media content displayed on the control module and selects the dynamic media content for display within one of the plurality of display sections.

31. A content control system, comprising:
a display module having a display device and an information appliance device connected to the display device and having assigned a unique identifier that is exclusive among a plurality of unique identifiers used with a plurality of information appliance devices of the content control system and a display processor to processes a signal having a static media content programmed for display on the display module and a dynamic media content selected from and pushed by the control module and includes consumer requested information requested by a user of the content module into displayable content for the display device;
a content module connected to the information appliance device and having a storage device storing data for the signal and a content processor that sends the signal to the information appliance device; and
a control module connected to the content module and having a user interface to view and select the data to be displayed on the display device.

32. The content control system according to claim 31, wherein the unique identifier is a randomly assigned identifier.

33. A content control system, comprising:
a display module having a display device and an information appliance device integrally formed into a single structural component with and connected to the display device and having a display processor to processes a signal having a static media content programmed for display on the display module and a dynamic media content selected from and pushed by the control module and includes consumer requested information requested by a user of the content module into displayable content for the display device;
a content module connected to the information appliance device and having a storage device storing data for the signal and a content processor that sends the signal to the information appliance device; and
a control module connected to the content module and having a user interface to view and select the data to be displayed on the display device.

34. A content control system, comprising:
a display module having a display device with a plurality of display sections and an information appliance device connected to the display device and having a display processor to processes a signal having a static media content programmed for display on the display module and a dynamic media content selected from and pushed by the control module and includes consumer requested information requested by a user of the content module into displayable content for the display device;
a content module connected to the information appliance device and having a storage device storing data for the signal and a content processor that sends the signal to the information appliance device; and
a control module connected to the content module and having a user interface to view and select the data to be displayed on the display device.

35. The content control system according to claim 34, wherein each of the plurality of display sections is a visual area containing the static media content.

36. The content control system according to claim 35, wherein the dynamic media content is displayed in one of the plurality of display sections after being selected by the user through the control module.

37. A content control system, comprising:
a display module having a display device and an information appliance device connected to the display device and having a display processor to processes a signal having a static media content programmed for display on the display module and a dynamic media content selected from and pushed by the control module and includes consumer requested information requested by a user of the content module into displayable content for the display device;
a content module connected to the information appliance device and having a storage device storing data for the signal, a content processor that sends the signal to the information appliance device, and a physical computer dedicated to serving a plurality of display modules and a plurality of control modules; and
a control module connected to the content module and having a user interface to view and select the data to be displayed on the display device.

38. The content control system according to claim 37, wherein the content module includes a storage device.

39. The content control system according to claim 38, further comprising an external storage module storing additional data for the signal which accessible by the content module through a communications component.

40. The content control system according to claim 39, wherein the external storage module is a single storage unit hosted externally by a third party.

41. The content control system according to claim 40, wherein the external storage module utilizes cloud computing resources to deliver the additional data to the content module.

42. The content control system according to claim 41, wherein the control module connects to the external storage module such that the control module displays the dynamic media content from the additional data stored on the external storage module and pushes a request to the content module.

43. A content control system, comprising:
a display module having a display device and an information appliance device connected to the display device and having a display processor to processes a signal having a static media content programmed for display on the display module and a dynamic media content selected from and pushed by the control module and includes consumer requested information requested by a user of the content module into displayable content for the display device;

a content module connected to the information appliance device and having a storage device storing data for the signal and a content processor that sends the signal to the information appliance device; and a control module connected to the content module and having a user interface to view and select the data to be displayed on the display device.

44. A content control system, comprising:

a display module having a display device and an information appliance device connected to the display device and having a display processor to processes a signal into displayable content for the display device;

a content module connected to the information appliance device and having a storage device storing data for the signal, a content processor that sends the signal to the information appliance device, and a physical computer dedicated to serving a plurality of display modules and a plurality of control modules; and a control module connected to the content module and having a user interface to view and select the data to be displayed on the display device.

45. The content control system according to claim 44, wherein the content module includes a storage device.

46. The content control system according to claim 45, further comprising an external storage module storing additional data for the signal which accessible by the content module through a communications component.

47. The content control system according to claim 46, wherein the external storage module is a single storage unit hosted externally by a third party.

48. The content control system according to claim 47, wherein the external storage module utilizes cloud computing resources to deliver the additional data to the content module.

49. The content control system according to claim 48, wherein the control module connects to the external storage module such that the control module displays the dynamic media content from the additional data stored on the external storage module and pushes a request to the content module.

50. A content control system, comprising:

a display module having a display device and an information appliance device connected to the display device and having a display processor to processes a signal into displayable content for the display device;

a content module connected to the information appliance device and having a storage device storing data for the signal and a content processor that sends the signal to the information appliance device; and a control module connected to the content module and having a user interface to view and select the data to be displayed on the display device through a physical display providing direct manipulation of the user interface by the user to select the dynamic media content presented through the user interface and pushed to the display module.

51. The content control system according to claim 50, wherein the control module includes peripherals to view, retrieve, select, and push data to the content module for display on the display module.

52. A content control system, comprising:

a display module having a display device and an information appliance device integrally formed into a single structural component with and connected to the display device and having a display processor to processes a signal into displayable content for the display device;

a content module connected to the information appliance device and having a storage device storing data for the signal and a content processor that sends the signal to the information appliance device; and a control module connected to the content module and having a user interface to view and select the data to be displayed on the display device.

* * * * *